Aug. 12, 1952            D. F. TOOT            2,606,457
ELECTRICAL CIRCUIT FOR TRANSMISSION CONTROLS
Filed Aug. 26, 1947            2 SHEETS—SHEET 1
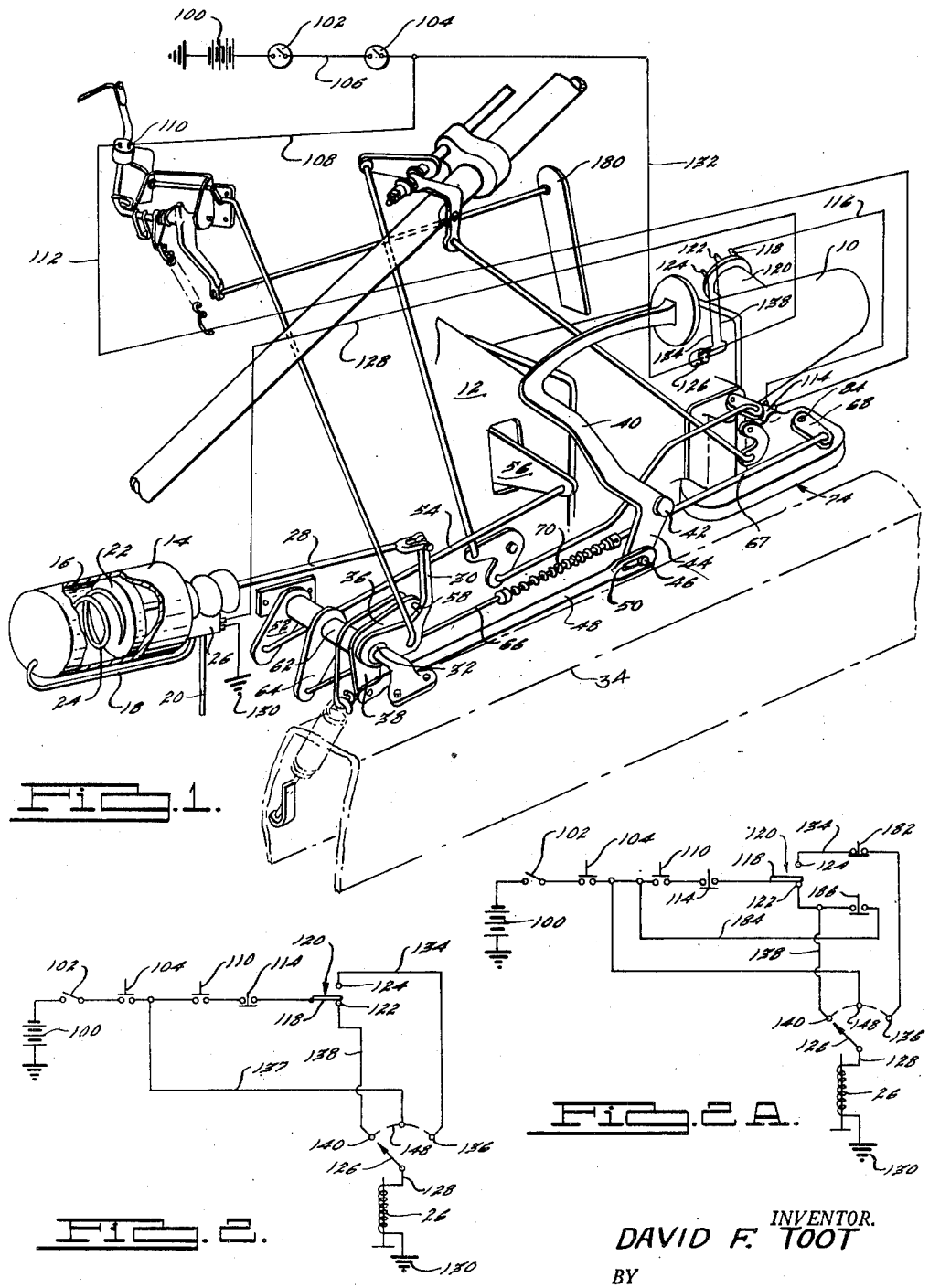
INVENTOR.
DAVID F. TOOT
BY
Harness and Harris
ATTORNEYS.

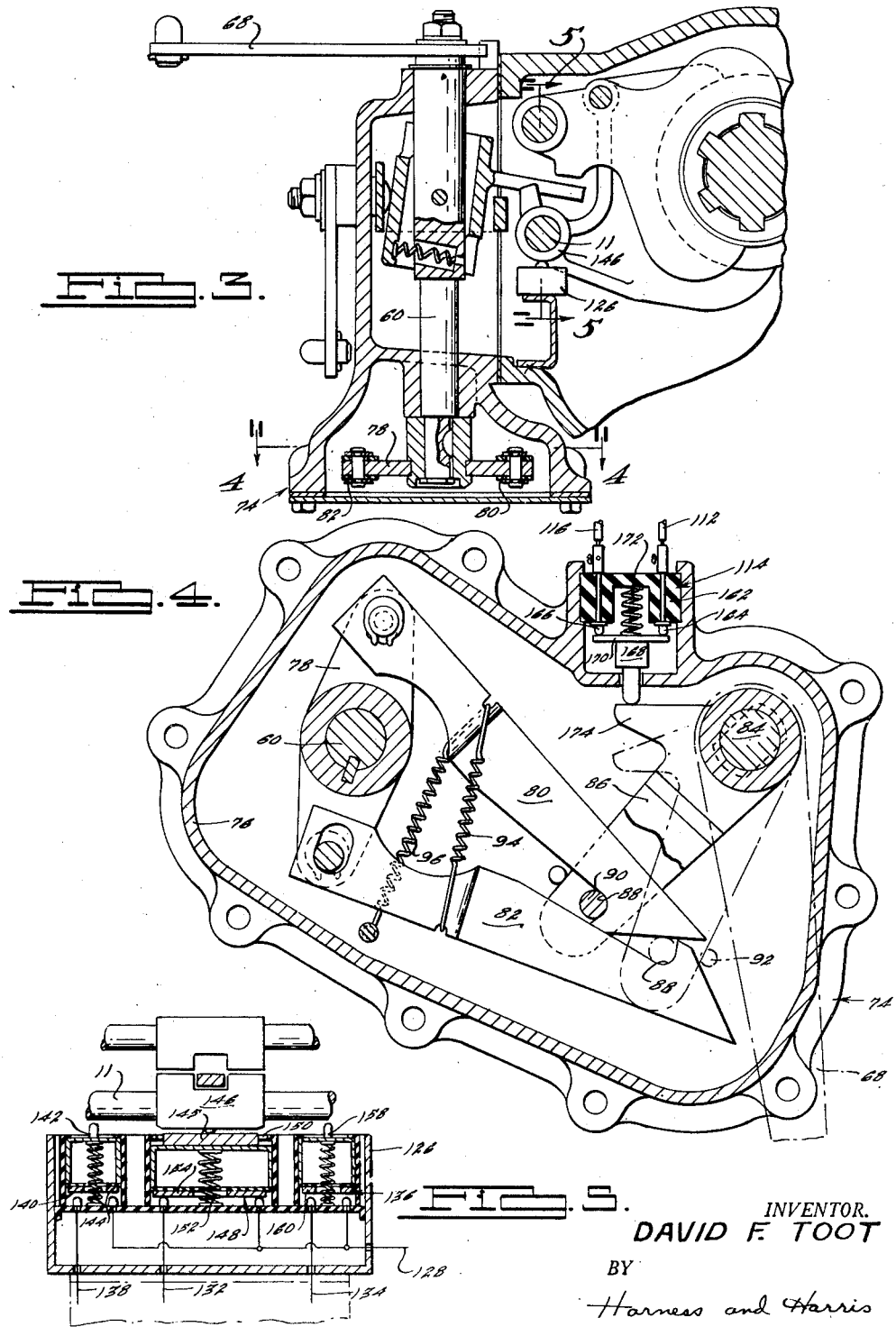

Patented Aug. 12, 1952

2,606,457

UNITED STATES PATENT OFFICE 2,606,457

ELECTRICAL CIRCUIT FOR TRANSMISSION CONTROLS

David F. Toot, Huntington Woods, Mich., assignor to Chrysler Corporation, Highland Park, Mich., a corporation of Delaware Application August 26, 1947, Serial No. 770,659

8 Claims. (Cl. 74—472)

1

This invention relates to an electrical circuit for a transmission and clutch control apparatus.

A control system for a clutch and transmission used in conjunction with a conventional fluid coupling was described in the copending application, Serial No. 755,612, filed June 19, 1947, by Maurice C. Robinson. The present invention provides an improved electrical circuit for the control system described therein, and more particularly incorporates a switch in the motion translating mechanism thereof which in combination with an electrical circuit is adapted to insure that the clutch will always reengage after a change in transmission speed ratio drive has been made by the control mechanism.

It is an object of this invention to assure that the clutch will be reengaged under conditions where the vehicle speed drops below governor speed after an upshift has been initiated by a control system of the type described in copending application, Serial No. 755,612. Under these conditions previous circuits have been tricked because the control circuit remained energized and the clutch would not reengage.

It is a further object of the invention to provide a circuit which will permit a kickdown to a lower speed ratio drive free of the potential dangers that the clutch will not be reengaged or will be reengaged very suddenly.

It is an additional object of the invention to provide means for overruling the governor of the transmission and clutch control mechanism immediately after a change in speed ratio drive has been initiated by the control mechanism and during the interval in which a clutch disengagement, change in speed ratio drive, and clutch reengagement are occurring.

Other objects and advantages of the invention will be apparent from the following description taken in connection with the accompanying drawings, in which:

Fig. 1 is a perspective view of a clutch and transmission control apparatus incorporating my invention;

Fig. 2 is a circuit diagram of the electrical circuit used in the Fig. 1 control apparatus;

Fig. 2-A is a modified circuit diagram;

Fig. 3 is a vertical section of a portion of the mechanism carried by the transmission housing;

Fig. 4 is a section on the line 4—4 of Fig. 3.

Fig. 5 is a partial section taken on the line 5—5 of Fig. 3.

The control mechanism to be described herein is adapted to actuate a transmission of the type illustrated in Patent No. 2,284,191 and a conventional friction clutch. Fig. 1 illustrates the relationship of the control mechanism to the clutch and transmission.

The control system to be described is particularly adapted for use in conjunction with a friction clutch and transmission when they are associated with a fluid coupling. The relation of the fluid coupling to the control system is described in the copending application, Serial No. 661,298, filed April 11, 1946, by Carl A. Neracher et al.

A motor vehicle transmission 10 has a conventional friction clutch 12 operatively associated therewith as illustrated in Fig. 1. An automatic control mechanism is associated with the transmission and clutch and adapted to control the operation thereof in response to predetermined vehicle operating conditions. The automatic transmission control mechanism is superimposed on a manual control of the type described in Patent No. 2,284,191. The selector mechanism described in the above patent is normally in engagement with one of the shift rails. This shift rail is designated by the numeral 11 in the drawings herein. The automatic control apparatus to be described herein only actuates the selector mechanism to move that one shift rail and does not engage the selector mechanism with the other shift rail. Therefore, the discussion herein of a control mechanism will be directed to means to selectively rotate the vertical control shaft of the transmission in opposite directions and thereby move the one shift rail in opposite directions. This rotation of the control shaft will create a relatively fast or a relatively slow speed ratio drive depending upon the direction of movement of the shift rail. For reasons of simplicity this will be referred to herein as effecting a change in the speed ratio drive between that which is commonly referred to in a conventional transmission as a second speed drive and that which is commonly referred to as direct drive. It is to be understood, however, that the movements of the control apparatus could effect any other change in speed ratio drive desired.

The control apparatus is powered by a piston adapted to be actuated under selected vehicle operating conditions by manifold vacuum. An airtight housing 14 containing a cylinder 16 has tubular connections 18 and 20 with the engine intake manifold. A piston 22 is slidably mounted in cylinder 16 and a spring 24 acting on piston 22 and reacting on housing 14 urges piston 22 to one end of cylinder 16. A solenoid actuated valve 26 is positioned between the tubular connections 18 and 20 and adapted when energized to operatively connect the tubular connections 18 and 20 so that air will be evacuated from the cylinder 16 by the intake manifold vacuum of the engine. The solenoid operated valve 26 is also adapted to vent cylinder 16 when it operatively disconnects tubular connections 18 and 20. Manifold low pressure, or vacuum as it is commonly referred to, by evacuating air from cylinder 16 overcomes spring 24 when valve 26 is open thereby moving the piston 22 to the left in Fig. 1. A piston rod 28 connects the piston 22 with an arm 30 which is rotatably mounted on a torque shaft 32. The torque shaft 32 has one end thereof rotatably mounted on the vehicle frame 34 and the other end rotatably mounted adjacent the engine block (not shown) in a manner well known in the art. A lever 36 keyed to shaft 32 is provided with a depending arm 38. The usual clutch pedal 40 is rotatably mounted at 42 on a shaft (not shown). An extension 44 of clutch pedal 40 depends below rotatable mounting 42 and has fixed thereto a pin 46. A rod 48 operatively connects arm 38 with pin 46. A slot 50 provided in rod 48 permits relative movement in one direction between rod 48 and pin 46. The upper end of lever 36 may be operatively associated with the usual over center clutch spring. A lever 52 is keyed to torque shaft 32. A rod 54 connects lever 52 with clutch throwout fork 56. Clutch throwout fork 56 engages a collar and operates a friction clutch 12 in a manner well known in the art. A typical clutch is illustrated and described in Patent No. 2,182,407. The lever 36 previously referred to is provided with a pin 58 which is adapted to be engaged by the arm 30 when the latter is rotated in a counterclockwise direction is response to movement of piston 22 under the influence of manifold vacuum. When the solenoid actuated valve 26 is energized and the piston 22 moved to the left in Fig. 1 piston rod 28 rotates arm 30 in a counterclockwise direction. Arm 30 engages and carries therewith the pin 58 associated with lever 36 thereby rotating the lever 36. The lever 36 is keyed to the torque shaft 32 and the torque shaft 32 is thus rotated. Rotation of the shaft 32 rotates the lever 52 which is keyed thereto. This pushes rod 54, rotates clutch throwout fork 56 and disengages the clutch 12. The rotation of the lever 36 and the depending arm 38 in this counterclockwise direction does not cause a depression of the clutch pedal 40 because of the cooperation of the slot 50 in rod 48 and the pin 46. This pin and slot combination permits movement of rod 48 to the right in Fig. 1 without an accompanying depression of clutch pedal 40. When solenoid actuated valve 26 closes the operative connection between tubular connections 18 and 20 and vents the cylinder 16, spring 24 returns the parts described in their original position permitting the clutch to reengage under the influence of its own self contained springs.

The movement of piston 22 also effects a change in transmission speed ratio drive by rotating the vertical control shaft 60. Reference may be made to Patent No. 2,284,191 for a further description of the means by which rotation of shaft 60 effects a change in the transmission speed ratio drive. The torque shaft 32 is provided with a collar 62 which is rotatably mounted thereon. An arm 64 is keyed to collar 62. A lever 68 is provided on a motion translating device 74 to be described herein and a pair of rods 66 and 67 are operably connected by a resilient lost motion connection 70 and respectively connected to arm 64 and lever 68. The resilient connection 70 cushions the motion of lever 68 in response to sudden movement of piston 22. The arm 30 is keyed to collar 62. Movement of the piston 22 is repeated by lever 68. As the piston 22 moves to the left in Fig. 1 the piston rod 28 rotates arm 30 in a counterclockwise direction. Rotation of collar 62 in a counterclockwise direction rotates lever 64 and moves rod 66 to the right in Fig. 1 thereby rotating the lever 68 in a counterclockwise direction. When the solenoid actuated valve closes and vents cylinder 16 the spring 24 returns piston 22 to the right end of housing 14 and moves lever 68 in a clockwise direction.

The lever 68 is adapted to actuate a motion translating device generally designated by the numeral 74. The device 74 is adapted to translate successive counterclockwise rotations of lever 68 to alternate counterclockwise and clockwise rotations of transmission control shaft 60 (Figs. 3 and 4). The device 74 is mounted in a housing 76 secured to the lower portion of the housing containing transmission 10. A lever 78 has a central portion thereof keyed to the transmission control shaft 60. A pair of fingers 80 and 82 are each rotatably mounted on lever 78 on opposite ends thereof. The lever 68 previously referred to is keyed to a shaft 84 which is mounted in the housing 76. The lever 68 and shaft 84 are rotated in response to movement of the piston 22 in the vacuum cylinder. A lever 86 is keyed to shaft 84 inside of the housing 76. The fingers 80 and 82 are each provided with a recessed portion 88 adapted to receive a pin 90 which is carried by the end portion of lever 86. In operation the pin 90 moves between the fingers 80 and 82. Rotation of the lever 86 in a counterclockwise direction from the solid line position illustrated in Fig. 4 will cause the pin 90 to engage and pull one of the fingers to the right as viewed in Fig. 4 to thereby rotate lever 78 and shaft 60. The direction of rotation of shaft 60 will be dependent upon whether finger 80 or 82 was moved by pin 90. The direction of rotation of shaft 60 will determine the speed ratio drive to be effected by the transmission 10. Rotation of lever 86 in a clockwise direction from the dotted line position in Fig. 4 is used to index the lever 86 relative to the fingers 80 and 82. The next succeeding counterclockwise movement of lever 86 will pull the other finger and reverse the rotation of shaft 60 thereby effecting a change in the transmission speed ratio drive. Movement of piston 22 under the influence of vacuum causes the counterclockwise rotation of lever 86 and the spring return of piston 22 causes the clockwise rotation of lever 86. An abutment in the form of a pin 92 may be provided to limit the rotation of lever 86 in a counterclockwise direction in Fig. 4. This retains the pin 90 between the fingers. A spring 94 urges the fingers together. A spring 96 is used to bias the alternator as explained in the copending application, Serial No. 755,612 filed June 19, 1947, by Maurice C. Robinson.

Means to control the actuation of the valve 26 and piston 22 is illustrated in Figs. 1, 2 and 2A. A grounded source 100 of electric energy is connected through ignition switch 102 to a switch 104 by an electrical conductor 106. Switch 104 is adapted to provide a selection between manual and automatic operation of the clutch and transmission and may be placed on the dash or other location convenient to manipulation by the driver of the vehicle. Electrical line 108 connects switch 104 with a switch 110 adapted to be closed when the throttle is substantially closed. Line 112 connects switch 110 with a switch 114 located in the motion translating mechanism. Line 116 connects switch 114 with the inlet terminal 118 of a vehicle speed responsive governor 120. The governor is provided with outlet terminals 122 and 124 and is adapted to electrically connect terminal 118 with the terminal 122 below a predetermined vehicle speed and to electrically connect the terminal 118 with the terminal 124 above this predetermined speed. A switch 126 is adapted to be actuated by movement of the shift rail in the transmission. This switch is illustrated in Fig. 5. A line 128 connects the switch 126 with the solenoid operated valve 26 which is grounded at 130. A line 132 interposed in the circuit between the switch 104 and 110 is connected to a central portion of switch 126. A line 134 electrically connects the terminal 124 of the speed responsive governor to a portion 136 of the rail switch 126. A line 138 connects terminal 122 of the speed responsive governor to a portion 140 of the rail switch 126. The portion 140 of the rail switch 126 comprises a spring returned plunger 142 having a contact member 144 attached thereto. When the shift rail 11 is moved to its high speed position which is to the left in Fig. 5, a fork member 146 thereon is adapted to depress the plunger 142 and bring the contact member 144 across lines 138 and 128. When the shift rail is moved to the right in Fig. 5 the initial movement frees the ball detent 142 and opens the switch portion 140. A small increment of travel then causes an abutment 145 on the fork member 146 to engage an intermediate switch portion 148. The switch 148 comprises a plate member 150 which is urged upwardly by a spring 152 and has a contact member 154 affixed thereto. The abutment 145 provided on the shift rail fork 146 is adapted to engage the plate 150 throughout a substantial portion of the movement of the shift rail. This depresses the contact 148 and causes line 132 to be electrically connected to line 128. Continued movement of the shift rail causes the abutment 145 to leave the plate 150. The fork member 146 then engages a ball detent 158 associated with the switch portion 136. The ball detent 158 is operatively associated with a contact member 160 which when depressed is adapted to electrically connect line 134 with line 128.

The switch 114 which is associated with the motion translating mechanism is illustrated in Fig. 4. The lines 112 and 116 are connected to switch 114. A body portion 162 is provided with terminals 164 and 166. These terminals are electrically connected to lines 112 and 116 respectively. A plunger element 168 carries a contact element 170 which is adapted to bridge the terminals 164 and 166. A spring 172 urges the plunger element 168 away from the terminals. The lever 86 which was previously described in the motion translating mechanism is provided with an abutment 174 which is adapted to engage the plunger member 168 under predetermined conditions to close the switch 114. The lever 86 is normally in the position illustrated in solid lines in Fig. 4. This position is furthest to the left as viewed in Fig. 4. This is the position assumed by the lever 86 when the solenoid actuator valve 26 is deenergized and the piston 22 at rest in the right end of the cylinder 16. When the solenoid valve 26 is energized and the piston 22 moves to the left in Fig. 1 the clutch throwout fork 56 is moved to the right to disengage the clutch and the lever 86 is moved to the right in Fig. 4 to move one of the fingers and thereby rotate the shaft 60 and to effect a change in transmission speed ratio drive. When the solenoid valve 26 is deenergized the piston 22 returns to the right in Fig. 1 and the lever 86 is indexed back to the solid line position in Fig. 4 so that it will be in position for the next change in speed ratio drive. The return of piston 22 also permits clutch 12 to reengage under the influence of springs contained therein. If for any reason the solenoid actuated valve 26 did not become deenergized after the clutch had been disengaged and the shaft 60 rotated the reengagement of the clutch would be prevented. The switch 114 is adapted to prevent this situation from occurring.

Referring to Fig. 2 the operation of the electrical circuit thus far described will be explained. In operation, the driver of the vehicle closes the ignition switch 102 as an incident to operation of the vehicle. If the driver wishes the automatic control mechanism described herein to effect for him changes in transmission speed ratio drive he so designates by closing switch 104 on the dash. When the vehicle is operating and the driver desires that a shift or change in speed ratio drive be effected he so signals by releasing his foot from an accelerator pedal 180 thereby closing switch 110. It will be noted that the switch 114 is normally in its closed position as illustrated in Fig. 4 prior to energization of the control system. The governor terminal 118 has been illustrated in Fig. 2 as in contact with the terminal 122. This indicates that the vehicle speed is low and the lower speed ratio drive desired. Electricity from the grounded storage battery 100 thus passes through the closed switches 102, 104, 110, 114 and through the terminal 118 to the terminal 122. If the vehicle is at that time operating in direct drive the shift rail 11 is in the left hand position in Fig. 5. The switch portion 140 of the rail switch 126 is therefore closed and line 128 operatively connected with line 138 and terminal 122. The grounded solenoid actuated valve 26 is thereby energized. The energization of valve 26 exposes the cylinder 16 to the intake manifold of the engine thereby moving piston 22 to the left in Fig. 1 to disengage the clutch 12 and to rotate transmission control shaft 60. Rotation of shaft 60 moves the shift rail 11 to the right in Fig. 5 to effect a lower speed ratio drive. The movement of the shift rail 11 to the right opens switch portion 140 of rail switch 126 and when the other speed ratio drive is effected by movement of the shift rail 11 to the extreme right the switch portion 136 is closed thereby connecting lines 134 and 128. As long as the vehicle speed remains below the predetermined governor speed the circuit is broken by the governor 120 and valve 26 deenergized. When the circuit is broken and the solenoid actuator valve 26 deenergized piston 22 is moved to the right in Fig. 1 by spring 24. This indexes the lever 86 of the motion translating mechanism of Fig. 4 and permits the clutch 12 to reengage. During normal operation of the vehicle the driver will then depress the accelerator pedal 180 thereby opening switch 110. If the vehicle should then accelerate sufficiently so that the predetermined speed of the governor is exceeded the terminal 118 thereof will contact the terminal 124. Since the vehicle is operating in its lower speed ratio drive with the shift rail 11 moved to the right in Fig. 5 the switch 136 is closed. If under these conditions the operator releases the accelerator pedal 180 and the switch 110 is closed a circuit is established and solenoid 26 is energized. The energization of solenoid 26 causes a clutch disengagement, a shift to direct drive in the transmission and clutch reengagement.

An intermediate portion 148 is provided in the shift rail switch 126. It will be observed that this intermediate portion of the switch is necessary for if the operator closed the accelerator switch 110 and before the completion of the shift should accidentally or through confusion step on the accelerator pedal 180 he would open the accelerator switch and interrupt the shift. The intermediate portion 148 of the shift rail switch 126 provides a means for bypassing the accelerator switch after the shift has been initiated. It will be noted by referring to Fig. 5 that after the initial movement of the shift rail 11 from either of its end positions the switch portion 148 is closed thereby connecting line 132 with line 128 and providing a circuit for energizing the solenoid which is independent of the accelerator switch 110.

The reason for the incorporation of switch 114 is best understood by an explanation of difficulties that could be encountered if the switch was not present in the circuit. If, for example, while the vehicle was climbing a grade a shift should be initiated it is possible that the vehicle speed would decrease below governor speed thereby changing the circuit through governor controlled switch 120 and causing the solenoid 26 to remain energized. For example, on an upshift if as the switch portion 140 of the shift rail switch 126 closed by the governor controlled switch 120 should cross over and contact terminals 118 and 122 a circuit to the solenoid 26 would thereby be established. This would keep the cylinder 16 evacuated and the piston 22 in the left hand position in Fig. 1 thereby preventing reengagement of the clutch. However, it should be noted that if switch 114 is present in the circuit it would be open under these circumstances because the lever 86 would be in the right hand position in Fig. 4. This would assure that the solenoid 26 would be deenergized and the clutch reengaged. After the reengagement of the clutch when the lever 86 is returned to the solid line position in Fig. 4 the switch 114 would, as in incident thereof, be closed preparatory to the next energization of the system.

It has sometimes been found desirable to incorporate a kickdown control so that the operator may place the transmission in a lower speed ratio drive in spite of the fact that the vehicle is at that time exceeding the predetermined governor speed. A modified wiring circuit showing this addition is illustrated in Fig. 2A. A switch 182 is incorporated in the line 134. The switch 182 is adapted to be closed only when the clutch pedal is in a position corresponding to clutch engagement. A line 184 is connected to the circuit between the switches 104 and 110 and to line 138 between terminal 122 and switch portion 140. A switch 186 which is interposed in the line 184 is adapted to be closed when the clutch pedal is in a position corresponding to disengagement of the clutch. The operator may effect a kickdown by disengagement of the clutch pedal. Thus, with the vehicle operating in direct drive above governor speed terminal 118 is in contact with the terminal 124 and the switch 128 has switch portion 140 closed. By depressing the clutch pedal the operator may close switch 186 to bypass the governor and permit current to flow from battery 100 through switch 102, switch 104, line 184, line 138, switch portion 140 and line 128 to solenoid valve 26. It will be noted that the switch 114 assists in the operation of the kickdown control. If the operator depresses the clutch to close switch 186 to effect a kickdown and releases the clutch pedal but fails to depress the accelerator the piston 22 will remain on the left hand portion of the cylinder 16 as illustrated in Fig. 1 and clutch 12 would be held in its disengaged position. There would, therefore, be no drive to the vehicle wheels. This would result because switch portion 136 would be closed after the kickdown, switch 182 would be closed when the clutch pedal was returned to the position corresponding to engagement of the clutch and since the vehicle is operating above governor speed contacts 124 and 118 of the governor control switch would be in engagement. If under these conditions the operator steps on the accelerator to open the throttle he deenergizes the solenoid valve 26 by opening switch 110. This would cause the clutch to reengage rapidly which would be uncomfortable and on icy pavement might skid the vehicle. The provision of switch 114 prevents these undesirable conditions from being obtained for at the time that the switch portion 136 of the shift rail switch is closed the switch 114 is automatically opened by the movement of lever 86 to the right in Fig. 4. Thus the closing of switch 182 when the clutch pedal is returned will have no effect. This assures that the solenoid actuated valve 26 will be deenergized and the piston 22 returned to the right end of cylinder 16 in Fig. 1. Clutch reengagement will then occur. The movement of the piston 22 to the right in Fig. 1 will also move the lever 86 to the left in Fig. 4 thereby closing switch 114 so that it will be ready for the next shift. The closing of this switch 114 does not however occur until the last portion of movement of piston 22 at which time the clutch is already reengaged.

I claim:

1. In an automotive vehicle provided with an accelerator operated switch, a battery, a vehicle speed responsive governor operated switch having a pair of terminals adapted to be selectively energized when the speed of said governor is less than a predetermined value and greater than a predetermined value, a change speed transmission, having a first speed ratio drive and a second speed ratio drive, power means for operating the transmission between said first speed ratio drive and said second speed ratio drive, said power means including a motor, a valve for controlling the operation of said motor, and means for controlling the operation of said valve including electromagnetic means, electrical means for controlling the operation of said valve operating electromagnetic means including a first switch, a circuit from said battery through said first switch and said accelerator operated switch to said governor operated switch, a third switch having a first circuit therethrough electrically connected to one of said governor operated switch terminals and adapted to be energized when said transmission is operating in said first speed ratio drive and a second circuit therethrough electrically connected to the other of said governor operated switch terminals and adapted to be energized when said transmission is operating in said second speed ratio drive, electrical connections between said third switch and said electromagnetic means and said electromagnetic means and said battery and means to open said first switch under all conditions when said power means is in other than a predetermined condition.

2. In a motor vehicle a variable speed transmission, a power operated member adapted to move from an initial position through a predetermined cycle including movement in a first direction and return in response to predetermined vehicle operating conditions, a first means adapted to alternate the drive in said transmission between a first and a second speed ratio drive in response to successive cycles of said power member, electrical means to control the movement of said member comprising a solenoid, a source of electric current, a governor controlled switch having an inlet terminal and first and a second outlet terminals, means connecting said source to said inlet terminal, a second switch having a first terminal electrically connected to said solenoid, a second terminal electrically connected to said first outlet terminal of said governor controlled switch and a third terminal electrically connected to said second outlet terminal of said governor controlled switch, means associated with said second switch and adapted to electrically connect the first terminal thereof with the second terminal thereof when said transmission is operating in said first speed ratio drive and to electrically connect the first terminal thereof with the third terminal thereof when said transmission is operating in said second speed ratio drive and switch means adapted to disconnect said source from said governor controlled switch as an incident to movement of said power member away from said initial position whereby said solenoid can only be energized through said governor controlled switch while said power operated member is in said initial position.

3. In a motor vehicle a variable speed transmission, a power operated member adapted to move from an initial position through a predetermined cycle including movement in a first direction and return in response to predetermined vehicle operating conditions, a first means adapted to alternate the drive in said transmission between a first and a second speed ratio drive in response to successive cycles of said power member, electrical means to control the movement of said member comprising a solenoid, a source of electric current, a governor controlled switch having an inlet terminal and first and a second outlet terminals, means connecting said source to said inlet terminal, a second switch having a first terminal connected to said solenoid, a second terminal electrically connected to said first outlet terminal of said governor controlled switch, a third terminal electrically connected to said second outlet terminal of said governor controlled switch, and a fourth terminal electrically connected to said source independently of said governor controlled switch, means associated with said second switch and adapted to electrically connect the first terminal thereof with the second terminal thereof when said transmission is operating in said first speed ratio drive, to electrically connect the first terminal thereof with the third terminal thereof when said transmission is operating in said second speed ratio drive and to electrically connect the first terminal thereof with said fourth terminal during the interval that a change in transmission speed ratio drive is being effected and when neither said first speed ratio drive or said second speed ratio drive is in operation, and switch means adapted to disconnect said source from said governor controlled switch as an incident to movement of said power member away from said initial position whereby said solenoid can only be energized while said member is in said initial position if either said first or said second speed ratio drives are in operation.

4. In an automotive vehicle provided with an accelerator operated switch, a battery, a vehicle speed responsive governor operated switch having a pair of terminals adapted to be selectively energized when the speed of said governor is less than a predetermined value and greater than a predetermined value, a change speed transmission, having a first speed ratio drive and a second speed ratio drive, power means for operating the transmission between said first speed ratio drive and said second speed ratio drive, said power means including a motor, a valve for controlling the operation of said motor, and means for controlling the operation of said valve including electromagnetic means, electrical means for controlling the operation of said valve operating electromagnetic means including a first switch, a circuit from said battery through said first switch and said accelerator operated switch to said governor operated switch, a third switch having a first circuit therethrough electrically connected to one of said governor operated switch terminals and adapted to be energized when said transmission is operating in said first speed ratio drive and a second circuit therethrough electrically connected to the other of said governor operated switch terminals and adapted to be energized when said transmission is operating in said second speed ratio drive and a third circuit therethrough electrically connected to said battery by a circuit which shunts said first switch, said accelerator operated switch and said governor operated switch, said third circuit being adapted to be energized during the interval in which a change in transmission speed ratio drive is being effected and when neither said first speed ratio drive or said second speed ratio drive is in operation, electrical connections between said third switch and said electromagnetic means and between said electromagnetic means and said battery and means to close said first switch only when said power means is in a position which establishes said first speed ratio drive or said second speed ratio drive.

5. In a motor vehicle a variable speed transmission, a power operated member adapted to move from an initial position through a predetermined cycle including movement in a first direction and return in response to predetermined vehicle operating conditions, a first means adapted to alternate the drive in said transmission between a first and a second speed ratio drive in response to successive cycles of said power member, means to control the movement of said member comprising a solenoid, a source of electric current, a governor controlled switch having an inlet terminal and first and a second outlet terminals, means connecting said source to said inlet terminal, a second switch having a first terminal connected to said solenoid, a second terminal electrically connected to said first outlet terminal of said governor controlled switch, a third terminal electrically connected to said second outlet terminal of said governor controlled switch, and a fourth terminal electrically connected to said source independently of said governor controlled switch, means associated with said second switch and adapted to electrically connect the first terminal thereof with the second terminal thereof when said transmission is operating in said first speed ratio drive, to electrically connect the first terminal thereof with the third terminal thereof when said transmission is operating in said second speed ratio drive and to electrically connect the first terminal thereof with said fourth terminal during the interval that a change in transmission speed ratio drive is being effected and when neither said first speed ratio drive or said second speed ratio drive is in operation and switch means operatively connected to said first means and adapted to disconnect said source from said governor controlled switch as an incident to movement of said first means and said power member away from said initial position whereby said solenoid can only be energized through said governor controlled switch while said first means is in a position corresponding to the initial position of said power operated member.

6. In a motor vehicle a variable speed transmission, a power operated member adapted to move from an initial position through a predetermined cycle including movement in a first direction and return in response to predetermined vehicle operating conditions, a first means adapted to alternate the drive in said transmission between a first and a second speed ratio drive in response to successive cycles of said power member, said first means comprising a first rotatable shaft operatively connected to said transmission, a pair of oppositely directed lever arms keyed to said shaft, a first finger element rotatably mounted on one of said lever arms and having an engageable portion, a second finger element rotatably mounted on the other of said lever arms and having an engageable portion, a movable element operatively connected to said power member for movement from an initial position and return in response to movement of said power member, said element being adapted to selectively engage said engageable portions of said fingers and to transmit motion through said fingers to rotate said first shaft, said element being adapted to engage one of said engageable portions and move one of said finger elements when moved from said initial position and to index itself when returned so that it will engage the other of said engageable portions during its next successive movement away from said initial position thereby to alternately move said first shaft in a first direction and in a second direction to effect said first and said second speed ratio drives in response to successive cycles of movement of said movable member, electrical means to control the movement of said power member and said first means comprising a solenoid, a source of electric current, a governor controlled switch having an inlet terminal and first and a second outlet terminals, means connecting said source to said inlet terminal, a second switch having a first terminal connected to said solenoid, a second terminal electrically connected to said first outlet terminal of said governor controlled switch, and a third terminal electrically connected to said second outlet terminal of said governor controlled switch, means associated with said second switch and adapted to electrically connect the first terminal thereof with the second terminal thereof when said transmission is operating in said first speed ratio drive and to electrically connect the first terminal thereof with the third terminal thereof when said transmission is operating in said second speed ratio drive, a third switch adapted to be operated by said movable element and to connect and disconnect said source from said governor controlled switch, said third switch having a first and a second position and adapted to be positioned in said first position only when said element is in said initial position whereby said solenoid can only be energized through said governor controlled switch when said movable element of said first means is in said initial position.

7. In a motor vehicle having a clutch and a variable speed transmission, an electrical control circuit responsive to vehicle operating conditions, a power operated device adapted to move in a first direction from an initial position in response to energization of said circuit and return in response to deenergization thereof, a first means operably connecting said power member and clutch, a second means including a motion translating device operably connecting said power device and said transmission whereby the first movement of said power operated device in the first direction away from said initial position which occurs as an incident to energization of said circuit effects a disengagement of said clutch and the establishment of a first transmission speed ratio drive and the return of said power device to said initial position which occurs as an incident to deenergization of said circuit effects a reengagement of said clutch, said motion translating device being operable during the next successive movement of said power device in its first direction and return with the accompanying clutch disengagement and reengagement to establish a second transmission speed ratio drive, a switch in said control circuit adapted to energize said electrical circuit when either of said transmission speed ratio drives are established and a second switch in said control circuit having a movable element operatively connected with said second means and operable to deenergize said circuit in response to movement of said power device in the first direction so that return of said power device to its initial position and reengagement of said clutch are assured after a change in transmission speed ratio drive has been effected.

8. In a motor vehicle having a clutch and a variable speed transmission, an electrical control circuit responsive to vehicle operating conditions, a power operated device adapted to move in a first direction from an initial position in response to energization of said circuit and return in response to deenergization thereof, a first means operably connecting said power member and clutch, a second means including a motion translating device operably connecting said power device and said transmission whereby the first movement of said power operated device in the first direction away from said initial position which occurs as an incident to energization of said circuit effects a disengagement of said clutch and the establishment of a first transmission speed ratio drive and the return of said power device to said initial position which occurs as an incident to deenergization of said circuit effects a reengagement of said clutch, said motion translating device being operable during the next successive movement of said power device in its first direction and return with the accompanying clutch disengagement and reengagement to establish a second transmission speed ratio drive, a switch in said control circuit adapted to energize said electrical circuit when either of said transmission speed ratio drives are established and a second switch in said control circuit having an element movable between switch closing and switch opening positions, said element being operatively connected with said second means for movement to its switch opening position to deenergize said circuit in response to movement of said power device in the first direction and for movement to its switch closing position upon return of said power device to its initial position.

DAVID F. TOOT.

REFERENCES CITED

The following references are of record in the file of this patent:

UNITED STATES PATENTS

| Number | Name | Date |
|---|---|---|
| 2,169,216 | Bloxsom | Aug. 15, 1939 |
| 2,187,824 | Britton | Jan. 23, 1940 |
| 2,222,913 | Pescara | Nov. 26, 1940 |
| 2,292,253 | Thurber | Aug. 14, 1942 |
| 2,528,772 | Neracher | Nov. 7, 1950 |
| 2,532,945 | Robinson | Dec. 5, 1950 |
| 2,536,462 | Price | Jan. 2, 1951 |